July 23, 1929.   C. DE LA BARRE DE NANTEUIL   1,721,547
HEATING SYSTEM FOR ALL VEHICLES
Filed Jan. 28, 1927   2 Sheets-Sheet  1

C. de la Barre de Nanteuil
INVENTOR

By Marks & Clerk
Attys.

July 23, 1929.   C. DE LA BARRE DE NANTEUIL   1,721,547
HEATING SYSTEM FOR ALL VEHICLES
Filed Jan. 28, 1927   2 Sheets-Sheet 2
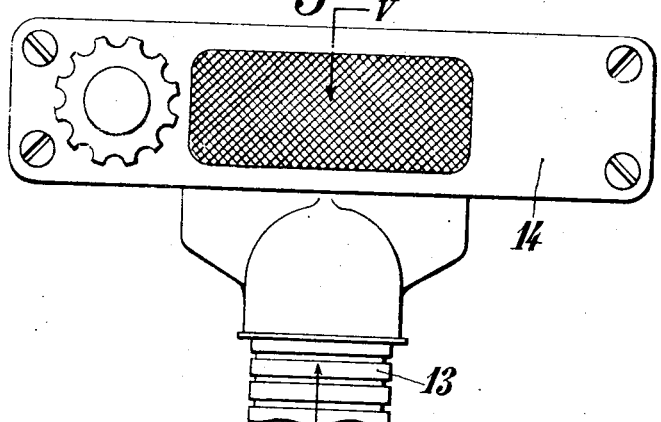
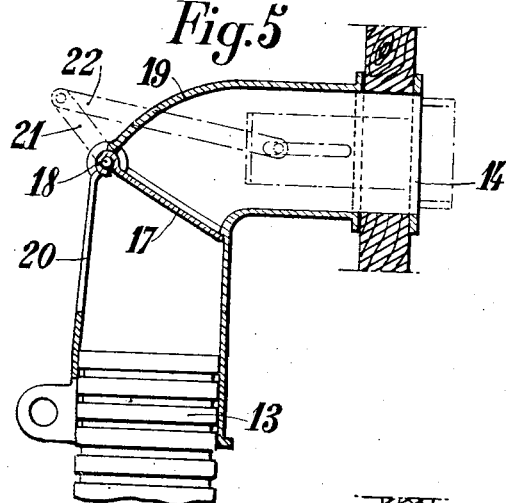
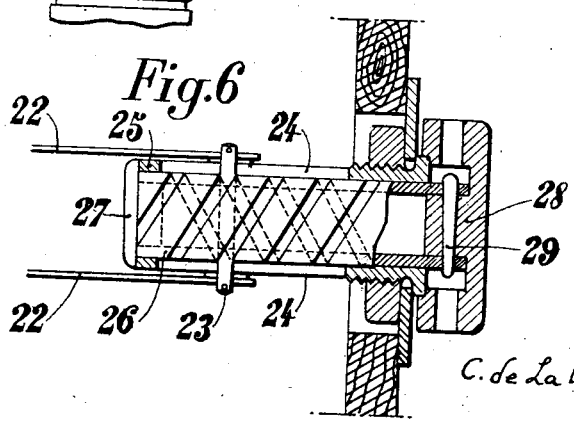
C. de La Barre de Nanteuil
INVENTOR
By: Marks & Clerk
Attys.

Patented July 23, 1929.

1,721,547

UNITED STATES PATENT OFFICE.

CHRISTIAN DE LA BARRE DE NANTEUIL, OF VERSAILLES, FRANCE.

HEATING SYSTEM FOR ALL VEHICLES.

Application filed January 28, 1927, Serial No. 164,314, and in France February 4, 1926.

The present invention has for its object the improvements of heating systems for all vehicles, on land, in the air, or in water and particularly for motor vehicles, in which the said heating is ensured by air passing through a heat exchanger heated particularly by the exhaust gases of the engine or any other source.

It has been noted, in practice, and particularly for heating enclosed motor vehicles, that it was necessary, for ensuring the ascent of hot air within the vehicle, to create a certain pressure for the entrance of cold air in the heat exchanger.

The main object of the present invention is to create the necessary pressure. For that purpose, the said improvements are particularly characterized by an air inlet conduit, arranged under the car, laterally to the heat exchanger, this air inlet nozzle being surrounded by a jacket open at both ends, this nozzle being adapted to canalize the air streams and to constrain a portion of the latter to penetrate into the said nozzle.

For want of this arrangement and for instance by the simple use of the air inlet nozzle, without any jacket surrounding the latter, the following phenomenon takes place: The air which is already in the nozzle is subjected to a certain pressure which opposes itself to its displacement, so that, in front of the nozzle, are created eddies preventing the atmospheric air to enter the nozzle, the air streams moving away as if they encountered a real stopper. A practice has shown that, by the use of a simple air inlet nozzle, even in the shape of a funnel, and owing to the fact that it is impossible to give to this funnel a sufficient length and a sufficiently small conicity, no pressure takes place to ensure the heating of the vehicle. On the contrary, this pressure occurs as soon as the air inlet nozzle is surrounded by a jacket which, as just stated, canalizes the air, the streams of which drive along, by capillarity and viscosity phenomena, a portion only of the air passing through the jacket into the nozzle connected to the heat exchanger.

This main feature of the invention can be carried into practice by a very great number of different means; all the modifications thus obtained are, of course, included within the scope of the invention. Particularly, it may be advantageous to give to the jacket surrounding the air nozzle a conical shape, like a convergent tube. A variable number of these convergent tubes can also be arranged in series, so as to obtain an amplification of the pressure produced, it being understood that a convergent tube surrounds, at least partially, the convergent tube following it, so that the air passing through the first convergent tube partly enters, by virtue of the phenomenon which has just been explained, into the second convergent tube, and so on.

The invention applies to all heating systems of the kind indicated, whatever may be the nature of the heat exchanger. However, it is to be noted that it is particularly advantageous to use the improvements which have just been indicated in combination with a tubular heat exchanger, the exhaust gases passing for instance through the tubes, and the air under pressure passging through the inter-tubular space, or reversely.

The invention comprises, moreover, certain arrangements which admit into the heat exchanger only air freed from dust, and which also prevent the projection of mud or water against the tubes of the heat exchanger. The general arrangement is, moreover, such that the evacuation of the mud projected is automatically obtained.

In view of the first of these objects, which is to prevent dust from reaching the heat exchanger, the air inlet nozzle in this exchanger is suitably bent, in such a manner that the air in movement in the nozzle is subjected to a rotation and that the dust drawn along by this air is projected, by centrifugal force, against the outer wall of the bend, which wall is provided with at least a groove or slot, through which the said dust can escape. Preferably, the inner lip of this slot is bent down for forming a kind of funnel facilitating the introduction of the dust in this slot, and its evacuation.

In view of the second of the objects above mentioned, which is to prevent the projections of mud or water against the tubes, which would give rise to steam penetrating with the air within the car, as well as for ensuring the evacuation of the mud in the convergent tube or tubes, use will preferably be made of the following means: At the entrance of the first convergent tube is arranged a grate the bars of which are arranged in a vertical plane, but such that their front face is inclined relatively to the vertical, so that the projections of mud or water, or even of stones, encountering the said bars, are rejected downwardly. Of course, the grate bars can have any cross section. However, it is to be noted that flat cross sections are preferable, because they offer much less resistance to the passage of the air than a circular cross section for instance. There is advantage in arranging a second grate, at the entrance of the air inlet nozzle. As previously, the front face of the bars will be very inclined relatively to the vertical. The mud stopped by this grate, and falling within the convergent tube which precedes the air inlet nozzle, will be expelled to the exterior by the air stream passing through the said convergent tube.

Finally, the invention further comprises the arrangement of an adjusting valve, near the hot air pipe opening within the car, the said valve permitting, by its operation, either to send the stream of hot air within the car, by obturating an opening provided in the hot air inlet pipe line, or to permit the evacuation of hot air to the exterior, by freeing this opening, and by obturating the inlet to the hot air pipe.

The accompanying drawing illustrates, by way of example only, a form of construction of the invention.

Fig. 4 is a front view of the hot air pipe.

Fig. 5 is a sectional view made according to line V—V of Fig. 4.

Fig. 6 is a sectional view of the device for operating the valve.

In the example illustrated, the exhaust gases enter at 1 in the tubular bundle formed by the tubes 2, which are mounted at their ends, in the plates 3, carried by a supporting casing 4.

Figure 2:
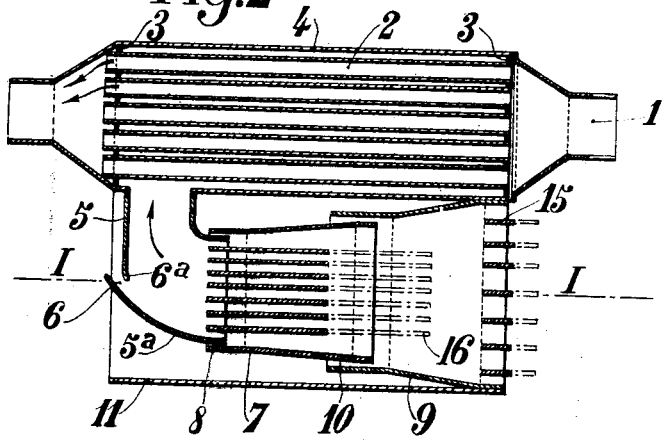
Fig. 2 is a sectional plan view made according to line II—II of Fig. 1.
Figure 3:
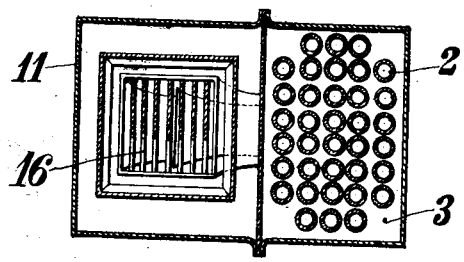
Fig. 3 is a sectional side view on line III—III of Fig. 1.

An air inlet nozzle 5 is arranged for allowing the outer air to enter into the tubular bundle at the rear end of the latter, in the direction of normal running of the vehicle. This air inlet nozzle is bent and is provided at 6 with an opening which extends throughout its height, the inner edge 6ª of this opening or slot being bent inwardly, as best shown in Fig. 2.

The free end of the bent nozzle 5 is surrounded by a jacket 7 which extends forwardly and is preferably of conical shape as illustrated, the conicity being such that the jacket 7 flares forwardly. A space is provided between the wall of the jacket 7 and the wall of the nozzle 5, as more particularly illustrated at 8 in Fig. 2. The front part of the jacket 7 is itself surrounded by another jacket 9 of similar construction, that is to say flaring forwardly. A space 10 is provided between the wall of the jacket 7 and the wall of the jacket 9. For supporting the jackets 9 and 7, as well as for improving the appearance of the apparatus, a covering 11 has been provided which is secured on the wall of the casing 4.

At the upper front part of the casing 4 of the tubular bundle, opens a connection 12 on which is branched a pipe line 13 leading to the hot air pipe 14, which, in this example, is provided on the cushion frame of the car.

The operation of the device illustrated is as follows:

The vehicle moving in the direction of the arrow, the air is canalized by the jacket 9. The air streams which are against the wall of the jacket 9 find a free issue through the space 10, so that the circulation of air within the jacket 9 is ensured. This circulation of air is absolutely necessary in order that a portion of the said air may enter into the jacket 7 and from the latter into the nozzle 5. If, for instance, the conical jacket 9 was directly connected to the nozzle 5, the air would not enter with a sufficient pressure, even when the vehicle runs rapidly, into the jacket 9. The air contained in the jacket 9 would form, in fact, a kind of stopper and the outer air stream, instead of entering the jacket 9, would laterally move away from the latter as in front of a solid obstacle. On the contrary the free circulation of the peripheral air streams in the convergent tube 9 ensures, by viscosity, the admission of a portion of the air in the jacket 7. Likewise, the free circulation, in the jacket 7, of the peripheral air streams, which escape through the space 8 ensures the admission of a portion of the air in the nozzle 5, the pressure being amplified at each stage.

The air entering the nozzle 5 passes in the tubular bundle, where it is heated by contact with the tubes brought to a high temperature by the exhaust gases. The hot air escapes through the connection 12 and the piping 13 for reaching the hot air pipe 14.

The nozzle 5 being bent, the air streams are subjected to a change of direction by rotation, so that the dust in suspension in the air is thrown, by centrifugal force, against the wall 5ª of the nozzle 5. The dust moves along this wall 5ª and escapes, through the opening 6, to the exterior.

Figure 1:
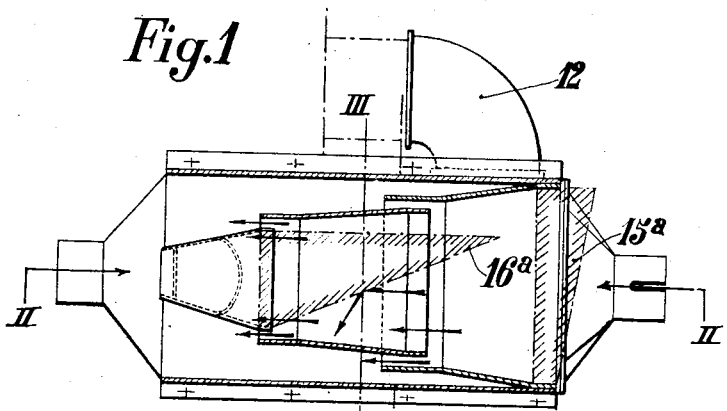
Fig. 1 is a sectional elevation made according to line I—I of Fig. 2.

At the front of the convergent tube 9 are arranged grate bars 15, these bars being preferably placed vertically. The said bars 15 have their front face 15ª inclined downwardly as shown more particularly in Fig. 1. It is advantageous that this inclination should be accentuated as possible. It is also advantageous that the bars 15 should be of flat cross section, so as to offer the least possible resistance to the admission of the air in the convergent tube 9. Likewise, at the front of the nozzle 5 is arranged another series of grate bars 16, the front face 16ª of which is greatly inclined as illustrated in Fig. 1. This arrangement of the grates has for effect to stop the projections and particularly the projections of mud or water which might take place. Moreover, the inclination of the bars, or better of their front face, rejects downwardly the particles projected. The particles which would have passed through the space between the bars 15 will usually encounter the bars 16 which are arranged opposite the intervals between the bars 15; these particles will therefore be stopped and will be projected downwardly, being collected at the lower part of the convergent tube 7, or of the convergent tube 9. The air draught, intense at high speeds, which is produced through the openings 8 and 10, will ensure the automatic removal of the particles thus projected.

A valve 17 is pivoted at 18 on the connection 19 where leads the piping 13, the connection 19 being secured on one side of the cushion frame and the hot air pipe on the other side of the said cushion frame. The valve 17, oscillating about the axis 18, can, as shown in Fig. 5, obturate the connection 19 when it is not desired to heat the vehicle; in this case, the hot air directly escapes to the exterior through the opening 20. On the contrary, when it is desired to heat the car, the valve 17 is bent down on the opening 20 for obturating it and so as to leave free the passage leading to the hot air pipe 14.

The control of the valve 17 can be effected by any suitable means and particularly by the following one: An arm 21 is rigid with the axis 18 of the valve 17, and this arm 21 is connected by links 22 to a rod 23 which is guided in two rectilinear opposite grooves 24 in a member 25 secured on the cushion frame. This member 25 is tubular and contains, within its bore, a rod 26, also tubular, and the wall of which is provided with two helical grooves of the same pitch, forming so to speak, a screw with two screw-threads. The rod 23 can thus pass diametrally through the member 25, through the grooves 24 and the rod 26 through the helical grooves formed in the same. The rod 26 abuts at its end against a stopper or plug 27, and at the other end against a knob 28, rendered rigid with the rod 26 by a pin 29.

By acting on the knob 28, the rod 26 will be caused to rotate; as the pin 23 is guided in the grooves 24, the rotation of the rod 26 will impart to the same, owing to the helical grooves, a movement of translation which will be transmitted to the links 22, thus ensuring the control of the valve.

It is to be understood that the form of construction described is capable of receiving a large number of modifications, which, presenting all the main features of the invention are obviously included within the scope of the latter.

What I claim as my invention and desire to secure by Letters Patent is:

1. In a heating system for vehicles, a heat exchanger comprising a conduit with a cold air inlet opening and a hot air outlet opening, and heating means for the air passing through the said conduit, an air inlet nozzle having an end connected to the cold air inlet opening of the said conduit, and the other end directed towards the front of the vehicle, a jacket of conical shape, the rear end of which, of small diameter, surrounds the front end of the said nozzle, leaving a certain space between this nozzle and the said jacket.

2. In a heating system for vehicles, a heat exchanger comprising a casing with a cold air inlet opening and a hot air outlet opening, and a bundle of tubes arranged in the said casing and through which pass the exhaust gases of an engine, an air inlet nozzle, having an end connected to the cold air inlet opening of the said casing, and the other end directed towards the front of the vehicle, a jacket of conical shape, the rear end of which, of smaller diameter, surrounds the front end of the said nozzle, leaving a certain space between this nozzle and the said jacket.

3. In a heating system for vehicles, a heat exchanger comprising a conduit with a cold air inlet opening and a hot air outlet opening, and heating means for the air passing through the said conduit, an air inlet nozzle connected to the cold air inlet opening of the said conduit, the said nozzle having a bent shape and being provided with an opening for the outer side of the said bent portion, whilst the other end of the nozzle is directed towards the front of the vehicle, a jacket of conical shape, the rear end of which, of smaller diameter, surrounds the front end of the said nozzle, leaving a certain space between this nozzle and the said jacket.

4. In a heating system for vehicles, a heat exchanger comprising a casing with a cold air inlet opening and a hot air outlet opening, and a bundle of tubes arranged in the said casing and through which pass the exhaust gases of an engine, an air inlet nozzle connected to the cold air inlet opening of the said conduit, the said nozzle having a bent shape and being provided with an opening for the outer side of the said bent portion, whilst the other end of the nozzle is directed towards the front of the vehicle, a jacket of conical shape, the rear end of which, of smaller diameter, surrounds the front end of the said nozzle, leaving a certain space between this nozzle and the said jacket.

5. In a heating system for vehicles, a heat exchanger comprising a conduit with a cold air inlet opening and a hot air outlet opening, and heating means for the air passing through the said conduit, an air inlet nozzle, having an end connected to the cold air inlet opening of the said conduit, and the other end directed towards the front of the vehicle, a jacket of conical shape, the rear end of which, of smaller diameter, surrounds the front end of the said nozzle, leaving a certain space between this nozzle and the said jacket, a grate arranged at the front end of the nozzle, this grate comprising bars arranged vertically but having their front face inclined so that the high portion of this front face extends further forward than the low portion.

6. In a heating system for vehicles, a heat exchanger comprising a conduit with a cold air inlet opening and a hot air outlet opening, and heating means for the air passing through the said conduit, an air inlet nozzle, having an end connected to the cold air inlet opening of the said conduit, and the other end directed towards the front of the vehicle, a plurality of jackets of conical shape the rear end of which, of smaller diameter, surrounds the front end of the following jacket, by leaving a certain space, the rear end of the last jacket surrounding the front end of the nozzle, by leaving a certain space, a grate arranged at the front end of the nozzle, this grate comprising bars arranged vertically but having their front face inclined so that the high portion of this front face extends further forward than the low portion, other grates arranged in a similar manner opposite certain of the jackets.

In testimony whereof I have signed my name to this specification.

CHRISTIAN de la BARRE de NANTEUIL.